July 28, 1964  D. C. LANGFORD  3,142,460
APPARATUS FOR FLOODING AND DRAINING OF RUNWAYS USED AS
LANDING AID AND SAFETY PRECAUTION FOR AIRCRAFT
Filed June 1, 1962  2 Sheets-Sheet 1
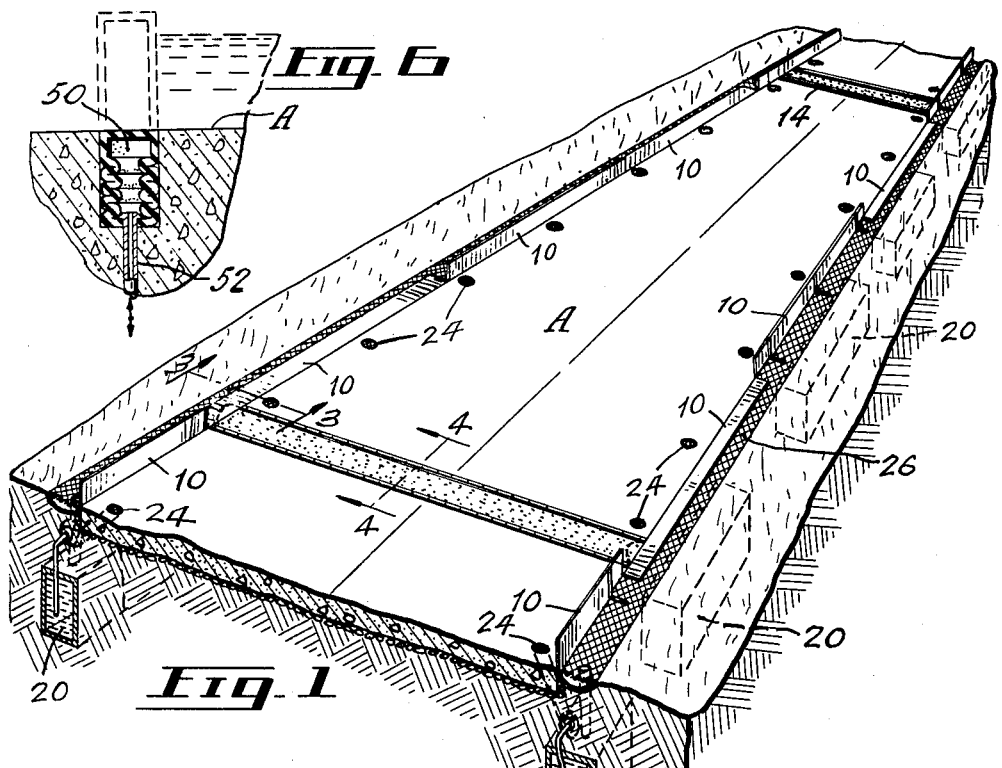
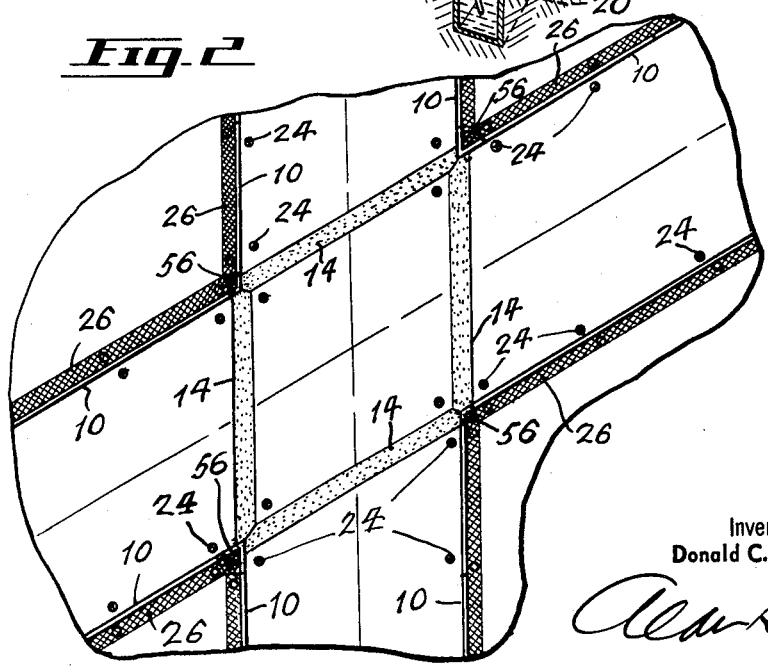
Inventor
Donald C. LANGFORD
Attorney July 28, 1964  D. C. LANGFORD  3,142,460
APPARATUS FOR FLOODING AND DRAINING OF RUNWAYS USED AS
LANDING AID AND SAFETY PRECAUTION FOR AIRCRAFT
Filed June 1, 1962  2 Sheets-Sheet 2
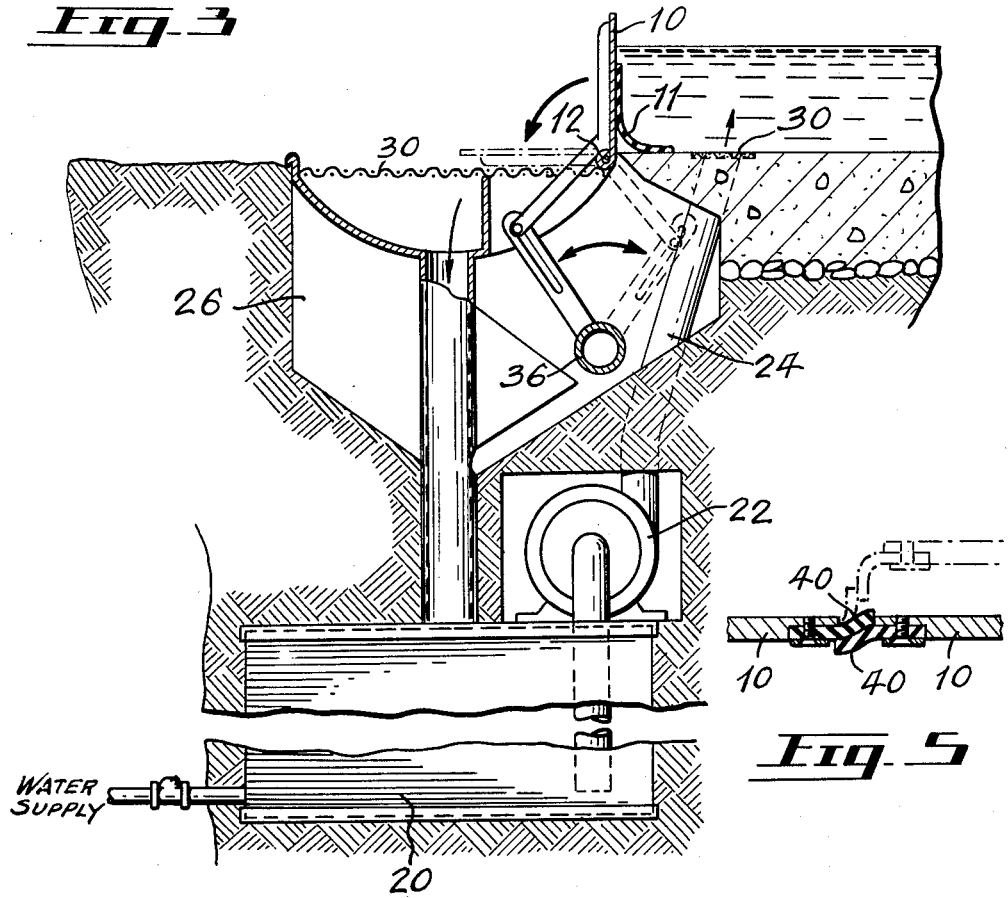
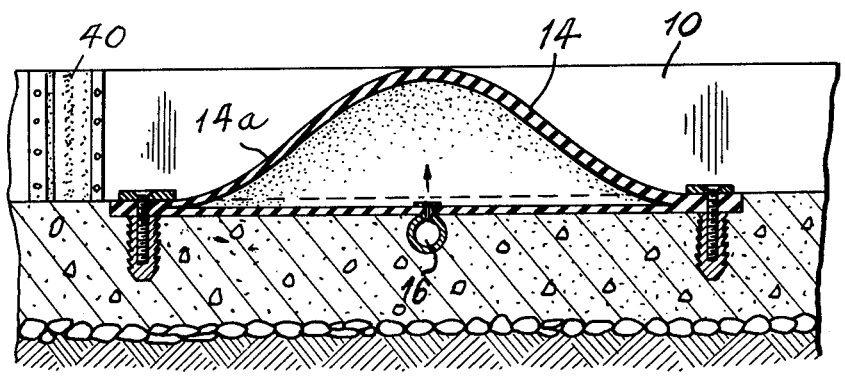
Inventor
Donald C. LANGFORD
Attorney

United States Patent Office 3,142,460
Patented July 28, 1964

3,142,460
APPARATUS FOR FLOODING AND DRAINING OF RUNWAYS USED AS LANDING AID AND SAFETY PRECAUTION FOR AIRCRAFT
Donald C. Langford, Hudson Heights, Quebec, Canada
Filed June 1, 1962, Ser. No. 199,491
8 Claims. (Cl. 244—114)

The present invention relates to landing aids for aircraft and more particularly to a method and apparatus whereby the controlled flooding and draining of a portion or all of a landing strip may be accomplished.

In accordance with the present invention, a runway construction is provided having collapsible water confining walls along each side with transverse inflated water barriers extending across between the side walls at spaced apart intervals established for the particular runway requirements. Means are provided in combination with the water confining walls and transverse barriers whereby each section so defined can be quickly flooded or drained to suit the desired operating conditions.

As a safety precaution, a flooded landing strip with a depth of water from say about 2" to 9" of water, would be extremely useful in the landing of modern heavy highspeed aircraft. The braking effect of the water would decelerate such aircraft in normal landing and reduce wear and tear on tires, including blow-outs, since initial contact with water covering the surface would start wheel rotation and reduce excessive heat from friction. In the case of emergencies, landing gear failure or the like, belly landings would be safer, helping to prevent ground loops, fire, and reducing structural damage. Further, it is a known fact that partial flooding of landing strips by natural causes, say a severe rainstorm, tends to make the strip slippery and at times causes "aquaplaning" after touchdown that negates braking and reduces control of the aircraft, which in some cases cannot be remedied for the entire distance of the runway resulting in the aircraft running off the end with subsequent damage and delays.

It is submitted that when such conditions exist, artificially flooding the runway to a predetermined depth would remedy the cause of such "aquaplaning" which takes place in relatively shallow water but not in deeper water as provided by the construction of the invention.

As will be appreciated, the water confining side walls and transverse barriers can be provided if desired only at the ends of the strip so that these sections only would be flooded to serve as a safety measure if an aircraft was not going to be able to come to a full stop within the dry length of the strip. This would also be useful in the case of an aborted take-off where flying speed was not achieved on the dry runway length, and through possible mechanical failure or pilot error the aircraft was going to over-run the runway.

Having thus generally described the nature of the invention, particular reference will be made to the accompanying drawings, showing by way of illustration, preferred embodiments thereof, and in which:

FIGURE 1 is a view in perspective elevation of a section of an aircraft landing strip embodying collapsible side walls and transverse barriers permitting controlled flooding and drainage for the purpose of the present invention, with certain of the walls shown in collapsed condition.

FIGURE 2 is a somewhat diagrammatic view in plan of an intersection between two landing strips equipped with the water confining walls and flooding and drainage means of the invention.

FIGURE 3 is a sectional view taken along the line 3—3 of the construction of FIGURE 1 to illustrate by way of an example one arrangement of a suitable flooding and draining assembly including means for erecting and dropping the water confining side walls.

FIGURE 4 is a sectional view of a typical transverse barrier as seen along the line 4—4 of FIGURE 1.

FIGURE 5 is an enlarged detail view of a water retaining joint arrangement between the ends of the water containing side walls.

FIGURE 6 is an enlarged cross sectional view of a suggested alternative form of a side wall construction wherein an inflatable barrier is adapted to be extended above the strip surface or deflated level with the strip.

With particular reference to FIGURE 1 of the drawings, a section of an aircraft landing strip is shown as being provided with means in accordance with the invention for the rapid flooding and drainage of sufficient water to cover the surface of the strip to a depth of say from about 2" to about 9" according to the needs of various aircraft. As is shown, the water is confined within the desired strip area by a plurality of adjoining side walls 10, which in the construction illustrated, are hingedly mounted at 12 for collapse outwardly of the strip "A" individually or in unison. Transverse barriers 14 are provided at spaced intervals between the side walls 10 so that any desired length of the strip can be flooded.

As is shown in FIGURE 4, each barrier 14 is preferably made as a hollow inflatable member of rubber or similar material which is anchored to the strip with a pressurized air conduit 16 communicating with the member at spaced apart intervals for inflation and deflation. The barrier 14 is preferably shaped as shown so as to have gradually sloping side walls 14a providing minimum obstruction to the wheels of an aircraft.

The barriers 14 are so constructed and located on the strip surface (tires passing over them would displace the air) to compartmentize and control water depths as required, to compensate for the usual grade, on the order of 1%, and to prevent water from piling up due to wind action.

As will be appreciated, it would not be too practical to attempt to flood the enclosed air strip portion directly from water mains and most certainly it would be entirely impractical to drain such water directly from the runway into adjoining ditches or the like. This would mean that a tremendous volume of water would be wasted and moreover the ground adjacent the air strip would be flooded. Accordingly, in accordance with the present invention, and as shown most clearly in FIGURES 1 and 5, tanks or reservoirs 20 are provided along each side of the strip and provision is made by pumps 22 to pump water from the reservoirs through water delivery ducts 24 onto the runway and gutters 26 are provided along the back of the side walls 10 which lead back to the reservoirs 20. A connection is made to each reservoir 20 from the main water supply to replace water loss and means are also provided to take care of reservoir overflow, say in the case of heavy rainfall.

It will be noted that the water delivery ducts 24 are disposed at an angle relative to the surface of the strip "A" so that the water delivered therefrom will be directed towards the centre of the strip to overcome adverse winds when flooding. The open ends of the ducts 24 and the open tops of the gutters 26 are covered with heavy steel mesh barriers 30 capable of supporting an aircraft.

In the construction illustrated, and as previously mentioned, the side walls 10 are hinged as indicated at 12 for collapse outwardly over the gutters 26. In order that the side walls 10 can be erected to water confining position means in the form of power driven links or hydraulic cylinders must be utilized which can be controlled from a remote control centre. In the construction illustrated, several lever arms 32 are provided on each of the wall sections 10 and these are pivotally linked to bellcranks 34 mounted on a shaft 36 driven by a suitable power source. While it is not shown in detail it is contemplated that the power drive to the shafts 36 would be through some form of a slip clutch so that the walls could be erected and retained against the water pressure by rotation of the shafts 36, and the shafts 36 released for controlled free rotation for rapid drainage and also for release on impact, say for example, by an aircraft running off the side of the runway. As is shown in FIGURES 3 and 5, each side wall 10 is provided with a flexible sealing skirt 11 and the ends of the adjacent wall sections 10 are provided with flexible overlapping sealing members 40 to reduce leakage as much as possible.

It will be understood that the described construction of the water confining side walls and associated mechanism is illustrative only of one means of accomplishing the applicant's purpose and other suitable means might be utilized for example, an inflatable rubber barrier 50 as shown somewhat diagrammatically in FIGURE 6.

In this arrangement, the barrier 50 would be inflated or deflated through conduits 52 connected to a suitable source of pressurized air so that the barriers could be erected along the sides of the strip as indicated in dotted lines, or alternatively could be deflated as shown with the upper surface substantially flush with the surface of the strip "A."

A further suitable means for this purpose would be an arrangement similar to the optional or temporary lane dividers used on some of the modern turnpikes or freeways. These are capable of being erected so as to extend from a position level with the road to a possible height as much as 18" above the road.

In the case of desired controlled flooding at or extending through a landing strip intersection, the transverse barriers 14 would extend across each strip "A" to provide a dam with the respective side walls 10, the meeting corners being sealed by suitable means, for example permanent rubber barriers 56 against which the end side walls 10 would abut as shown in FIGURE 2.

In below freezing climates water could be heated above the freezing point in the reservoirs 22 and the strip heated by radiant heating pipes supplied from the reservoirs. If this arrangement were utilized in combination with the present invention the problem of snow removal would be eliminated. The exact water depths required for most effective use for various aircraft and conditions can only be arrived at through tests but the applicant estimates that they should not be less than about 2" and not more than about 9". The desired depth of course can be readily maintained by stand pipes, spring loaded for easy depression, or other known water level sensors.

I claim:

1. An apparatus for the controlled flooding and draining of at least a portion of an aircraft runway as a landing aid, comprising in combination, a plurality of collapsible walls disposed along the longitudinal side edges of the surface of said runway in alignment and adapted to extend above said runway surface and constitute substantially continuous water confining barriers, a plurality of transverse collapsible walls disposed transversely of said runway portion to extend above said runway surface at spaced apart intervals between said longitudinal walls, a plurality of water reservoirs disposed beneath the level of said runway surface, water delivery ducts leading from said reservoirs to said runway surfaces surrounded by said water confining barriers, a plurality of water receiving gutters extending exteriorly of and co-extensive with said longitudinal water confining walls, duct connections from said gutters to said water reservoirs, means for erecting said longitudinal water confining walls above said runway surface in water confining position and means for collapsing said longitudinal water confining walls to a position substantially in the plane of said runway surface permitting water so confined to flow to said gutters and water reservoirs.

2. An apparatus for the controlled flooding and draining of aircraft runways as claimed in claim 1 wherein said longitudinal collapsible walls comprise rectangular panels hingedly mounted along the side edge of said runway surface and said means for erecting and collapsing said side walls includes mechanical linkage adapted to move said panels between a substantially vertical position and a substantially horizontal position outwardly from said runway.

3. An apparatus for the controlling of flooding and draining of aircraft runways as claimed in claim 1, wherein each of said transverse barriers comprise an inflatable hollow member of flexible material and means are provided beneath the surface of said runway for the inflation and deflation of said member.

4. An apparatus for the controlled flooding and draining of aircraft runways as claimed in claim 1 wherein said longitudinal collapsible walls comprise hollow inflatable members of material mounted for extension and retraction relative to the surface of said runway portion.

5. An apparatus for the controlled flooding and draining of aircraft runways as claimed in claim 1 wherein said gutters and water delivery ducts are masked by perforated gratings providing aircraft supporting surfaces exteriorly and interiorly of said runway surface.

6. An apparatus for the controlled flooding and draining of at least a portion of an aircraft runway as a landing aid, comprising in combination a collapsible barrier wall disposed about at least a portion of said runway to form a substantially continuous water confining barrier with the surface of said runway portion, means for erecting said barrier wall above said runway surface in water confining position and means for collapsing at least a portion of said barrier wall to a position substantially in the plane of said runway surface releasing water confined within said wall, means to deliver water to said runway portion, and means to collect said water when released by said barrier wall collapse.

7. An apparatus as claimed in claim 6 wherein said collapsible barrier wall comprises a plurality of adjacent collapsible wall sections extending along the longitudinal side edges of the surface of said runway portion and a further plurality of collapsible walls disposed transversely of said runway portion to extend above said runway surface at spaced intervals between said longitudinally extending walls.

8. An apparatus as claimed in claim 6 wherein said means to deliver water to said runway portion and said means to collect said water comprises a plurality of water reservoirs disposed beneath the level of said water surface, water delivering ducts leading from said reservoir to said surface surrounded by said barrier wall, water receiving gutters extending exteriorly of said collapsible barrier wall, and duct connections from said gutters to said water reservoir.

References Cited in the file of this patent

UNITED STATES PATENTS

| 2,433,238 | Ramirez | Dec. 23, 1947 |
| 2,466,150 | Burt | Apr. 5, 1949 |

FOREIGN PATENTS

| 710,963 | Great Britain | June 23, 1954 |